United States Patent
Parolini et al.

(10) Patent No.: US 9,931,818 B1
(45) Date of Patent: Apr. 3, 2018

(54) METHOD FOR FORMING CMC ARTICLE

(71) Applicant: GENERAL ELECTRIC COMPANY, Schenectady, NY (US)

(72) Inventors: Jason Robert Parolini, Greer, SC (US); Jon Conrad Schaeffer, Simpsonville, SC (US); Arthur S. Peck, Greenville, SC (US); Srikanth Chandrudu Kottilingam, Greenville, SC (US); Canan Uslu Hardwicke, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/479,872

(22) Filed: Apr. 5, 2017

(51) Int. Cl.
| | |
|---|---|
| *B29C 65/00* | (2006.01) |
| *B29C 53/82* | (2006.01) |
| *C03B 29/00* | (2006.01) |
| *C04B 35/64* | (2006.01) |
| *B32B 18/00* | (2006.01) |
| *B32B 7/04* | (2006.01) |
| *B32B 5/08* | (2006.01) |
| *B32B 37/12* | (2006.01) |

(Continued)

(52) U.S. Cl.
CPC ........... *B32B 18/00* (2013.01); *B32B 5/08* (2013.01); *B32B 7/04* (2013.01); *B32B 37/12* (2013.01); *B32B 38/0036* (2013.01); *C04B 35/528* (2013.01); *C04B 35/532* (2013.01); *C04B 35/573* (2013.01); *B32B 2305/10* (2013.01); *B32B 2313/04* (2013.01); *B32B 2315/02* (2013.01); *B32B 2603/00* (2013.01); *C04B 35/524* (2013.01); *C04B 35/571* (2013.01); *C04B 35/591* (2013.01); *C04B 35/62286* (2013.01); *C04B 2235/48* (2013.01); *C04B 2237/38* (2013.01); *C04B 2237/385* (2013.01); *C04B 2237/58* (2013.01)

(58) Field of Classification Search
CPC ... C04B 35/524; C04B 35/528; C04B 35/532; C04B 35/573; C04B 35/591; C04B 35/571; C04B 35/622864; C04B 2235/48; C04B 2237/38; C04B 2237/58; C04B 2237/385; B32B 18/00; B32B 5/08; B32B 7/04; B32B 37/12; B32B 38/0036; B32B 2305/10; B32B 2313/04; B32B 2315/02; B32B 2603/00
See application file for complete search history.

(56) References Cited

U.S. PATENT DOCUMENTS

| | | | | |
|---|---|---|---|---|
| 4,772,502 A | * | 9/1988 | Okura | ............ C04B 35/83 428/293.4 |
| 4,781,993 A | * | 11/1988 | Bhatt | ............ C04B 35/591 428/293.4 |

(Continued)

*Primary Examiner* — Alex Efta
(74) *Attorney, Agent, or Firm* — McNees Wallace & Nurick LLC

(57) ABSTRACT

A method for forming a CMC article is disclosed, including forming a CMC precursor ply assembly. Forming the CMC precursor ply assembly includes laying up a plurality of CMC precursor plies and entraining a melt infiltration agent to form an entrained agent supply. Each of the plurality of CMC precursor plies includes a matrix precursor and a plurality of ceramic fibers. The plurality of CMC precursor plies and the entrained agent supply are arranged to form the CMC precursor ply assembly, which includes an article conformation. The method further includes carbonizing the CMC precursor ply assembly, infusing the melt infiltration agent from the entrained agent supply into the plurality of CMC precursor plies, and densifying the CMC precursor ply assembly with the melt infiltration agent to form the CMC article.

18 Claims, 2 Drawing Sheets

(51) Int. Cl.
*B32B 38/00* (2006.01)
*C04B 35/573* (2006.01)
*C04B 35/532* (2006.01)
*C04B 35/528* (2006.01)
C04B 35/571 (2006.01)
C04B 35/524 (2006.01)
C04B 35/591 (2006.01)
C04B 35/622 (2006.01)

(56) References Cited

U.S. PATENT DOCUMENTS

| | | |
|---|---|---|
| 6,254,974 B1 * | 7/2001 | Hanzawa .............. C04B 35/573 428/212 |
| 6,627,019 B2 | 9/2003 | Jarmon et al. |
| 6,746,755 B2 | 6/2004 | Morrison et al. |
| 6,984,277 B2 | 1/2006 | Morrison et al. |
| 7,153,464 B2 | 12/2006 | Millard et al. |
| 7,238,247 B2 | 7/2007 | Bouillon et al. |
| 8,167,573 B2 | 5/2012 | Merrill et al. |
| 8,876,481 B2 | 11/2014 | Huang et al. |
| 2011/0048620 A1 | 3/2011 | Foucault et al. |
| 2013/0011654 A1 * | 1/2013 | Han ...................... C04B 35/571 428/293.4 |
| 2013/0167374 A1 * | 7/2013 | Kirby ..................... C04B 35/64 29/888.02 |
| 2013/0285296 A1 | 10/2013 | Gray et al. |
| 2014/0048978 A1 | 2/2014 | Taxacher et al. |
| 2014/0260281 A1 | 9/2014 | Innes |
| 2014/0261986 A1 | 9/2014 | Lazur et al. |
| 2014/0271161 A1 | 9/2014 | Lazur |
| 2015/0004000 A1 | 1/2015 | Freeman et al. |

\* cited by examiner

METHOD FOR FORMING CMC ARTICLE

FIELD OF THE INVENTION

The present invention is directed to methods for forming ceramic matrix composite ("CMC") articles. More particularly, the present invention is directed to methods for forming CMC articles including entraining a melt infiltration agent.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, airfoils, buckets (blades), bucket (blade) dovetails, nozzles (vanes), shrouds, combustor liners, combustor transition pieces, disks, ducts, augmentors, exhaust nozzles, and casings, from CMC. However, CMC components, particularly those CMC components which include thick solid sections, may be difficult to fully densify due to insufficient melt infiltration throughout the thick solid section.

BRIEF DESCRIPTION OF THE INVENTION

In an exemplary embodiment, a method for forming a CMC article includes forming a CMC precursor ply assembly. Forming the CMC precursor ply assembly includes laying up a plurality of CMC precursor plies and entraining a melt infiltration agent to form an entrained agent supply. Each of the plurality of CMC precursor plies includes a matrix precursor and a plurality of ceramic fibers. The plurality of CMC precursor plies and the entrained agent supply are arranged to form the CMC precursor ply assembly, and the CMC precursor ply assembly includes an article conformation. The CMC precursor ply assembly is carbonized, and the melt infiltration agent from the entrained agent supply is infused into the plurality of CMC precursor plies. The CMC precursor ply assembly is densified with the melt infiltration agent to form the CMC article.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary methods for forming CMC articles. Embodiments of the present disclosure, in comparison to articles and methods not utilizing one or more features disclosed herein, decrease costs, increase process efficiency, increase quality, increase durability, increase strength, increase stiffness, improve aeroelastic response, reduce part-to-part material property variation, increase process yield, or a combination thereof.

Figure 1:
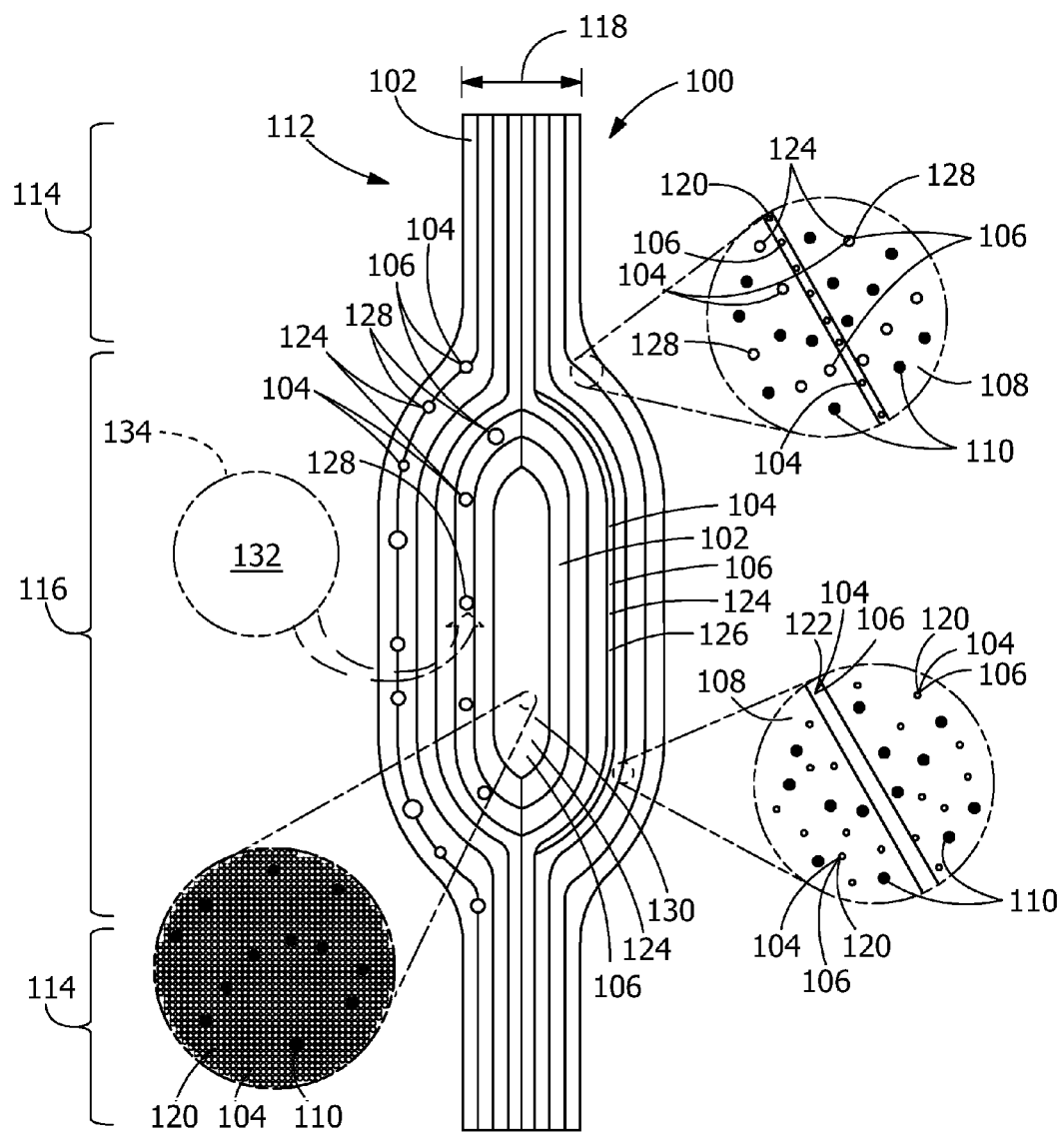
FIG. 1 is a cross-sectional view of a CMC precursor ply assembly, according to an embodiment of the present disclosure.
Figure 2:
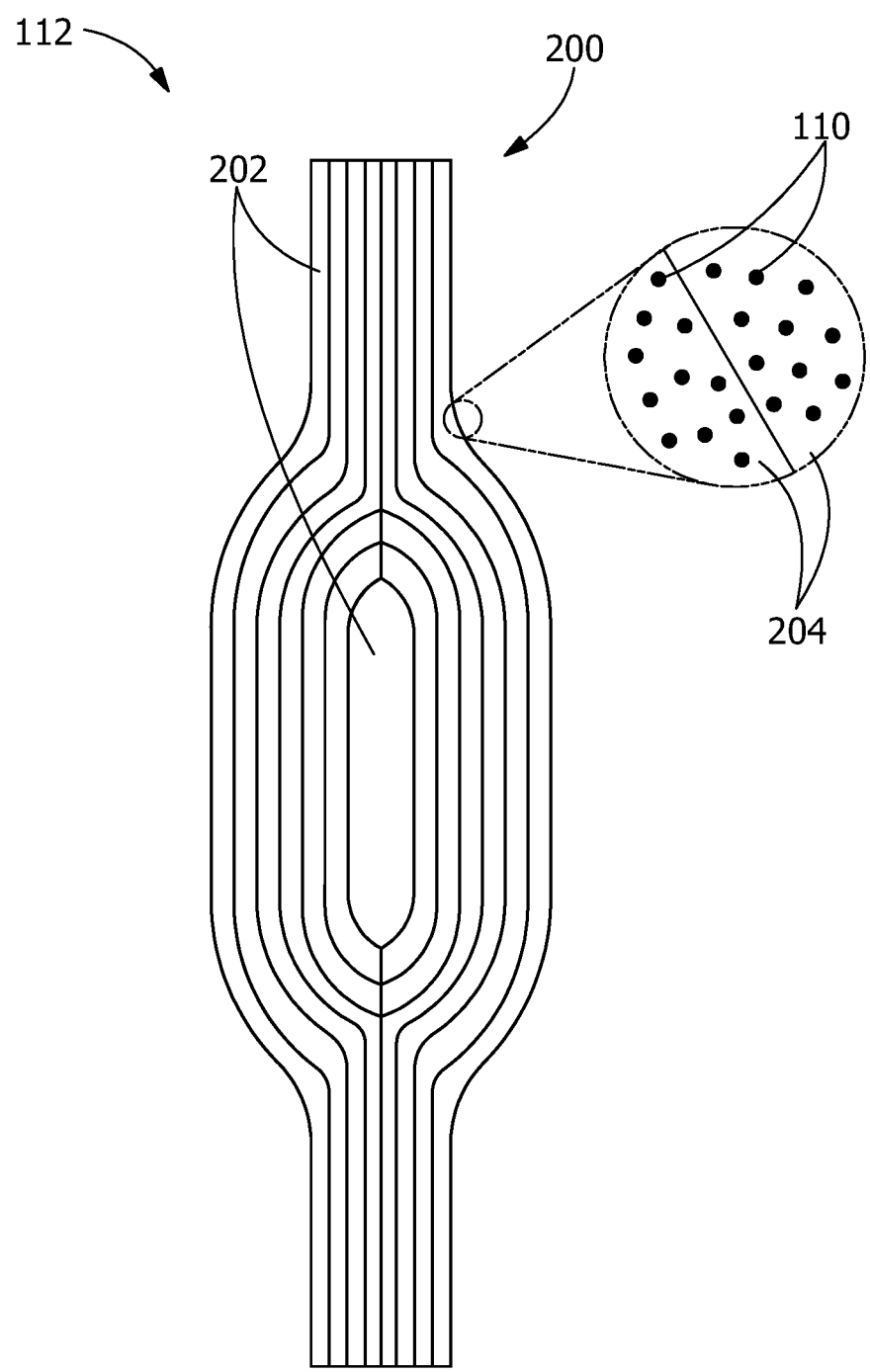
FIG. 2 is a cross-sectional view of a CMC article formed from the CMC precursor ply assembly of FIG. 1, according to an embodiment of the present disclosure.

Referring to FIGS. 1 and 2, a method for forming a CMC article 200 includes forming a CMC precursor ply assembly 100. Forming the CMC precursor ply assembly 100 includes laying up a plurality of CMC precursor plies 102 and entraining a melt infiltration agent 104 to form an entrained agent supply 106. Each of the plurality of CMC precursor plies 102 includes a matrix precursor 108 and a plurality of ceramic fibers 110. The plurality of CMC precursor plies 102 and the entrained agent supply 106 are arranged to form the CMC precursor ply assembly 100, and the CMC precursor ply assembly 100 includes an article conformation 112. The CMC precursor ply assembly 100 is carbonized, and the melt infiltration agent 104 from the entrained agent supply 106 is infused into the plurality of CMC precursor plies 102. The CMC precursor ply assembly 100 is densified with the melt infiltration agent 104 to form the CMC article 200.

In one embodiment, infusing the melt infiltration agent 104 into the CMC precursor ply assembly 100 and densifying the CMC ply assembly 100 is more complete than in a comparative method in which the CMC precursor ply assembly 100 lacks the entrained agent supply 106. By way of example, for a 0.3 inch thick plate of the CMC precursor ply assembly 100, with double-sided infiltration, densification on an absolute basis may be about 24% to about 34% more complete with the entrained agent supply 106 than without the entrained agent supply 106 (i.e., about 90% to about 100% dense with the entrained agent supply 106 in comparison to about 66% dense without the entrained agent supply 106).

The entrained agent supply 106 may be disposed on the plurality of CMC precursor plies 102, between the plurality of CMC precursor plies 102, within the plurality of CMC precursor plies 102, or combinations thereof.

In one embodiment, the melt infiltration agent 104 of the entrained agent supply 106 is homogenously distributed throughout the CMC precursor ply assembly 100. In another embodiment, the melt infiltration agent 104 of the entrained agent supply 106 is heterogeneously distributed throughout the CMC precursor ply assembly 100. Heterogeneously distributing the melt infiltration agent 104 of the entrained agent supply 106 may include distributing an increased density of the melt infiltration agent 104 in a first portion 114 of the CMC precursor ply assembly 100 relative to a second portion 116 of the CMC precursor ply assembly 100, wherein the first portion 114 includes an assembled ply thickness 118 greater than the second portion 116.

In one embodiment, the assembled ply thickness 118 of the first portion 114 is at least about 0.2 inches, alternatively at least about 0.3 inches, alternatively at least about 0.5 inches, alternatively at least about 1 inch, alternatively at least about 1.5 inches, alternatively at least about 2 inches, alternatively at least about 5 inches.

The entrained agent supply 106 may constitute any suitable proportion of the CMC precursor ply assembly 100, including, but not limited to, by weight, at least about 10% of the CMC precursor ply assembly 100, alternatively at least about 15%, alternatively at least about 20%, alternatively at least about 25%, alternatively at least about 30%, alternatively at least about 40%, alternatively at least about 50%, alternatively between about 5% and about 60%, alternatively between about 10% and about 55%, alternatively between about 15% and about 50%, alternatively between about 5% and about 25%, alternatively between about 20% and about 40%, alternatively between about 35% and about 60%.

The melt infiltration agent 104 may include any suitable composition, including, but not limited to, silicon, silicon alloys, or combinations thereof. As used herein, "combinations" is to be construed as including mixtures, coincident but distinct compositions, and multi-phase compositions. In one embodiment, silicon refers to metalloidal silicon, and consists essentially of elemental silicon, along with incidental impurities.

The entrained agent supply 106 may include any suitable structure, including, but not limited to, a melt infiltration agent powder 120, a melt infiltration agent coating 122, a melt infiltration agent construct 124, a melt infiltration agent ply 126, a melt infiltration agent fiber 128, a melt infiltration agent mandrel 130, or combinations thereof. As used herein, "construct" refers to a three-dimensional object having a predetermined conformation.

In one embodiment, wherein the entrained agent supply 106 includes a melt infiltration agent powder 120, the melt infiltration agent powder 120 may be dispersed in the matrix precursor 108, disposed on the ceramic fiber 110, disposed on at least one CMC precursor ply 102, or combinations thereof.

In another embodiment, wherein the entrained agent supply 106 includes a melt infiltration agent coating 122, the melt infiltration agent coating 122 may be disposed on the ceramic fiber 110, disposed on at least one CMC precursor ply 102, or both. The melt infiltration agent coating 122 may be applied by any suitable technique, including, but not limited to, thermal spraying, cold spraying, chemical vapor deposition, physical vapor deposition, liquid phase deposition, dipping, submerging, painting, or combinations thereof.

The melt infiltration agent construct 124 may include any suitable conformation, including the melt infiltration agent ply 126, the melt infiltration agent fiber 128, a pellet, a mandrel 130 for laying up CMC precursor plies 102, or any other three-dimensional object. The melt infiltration agent construct 124 may be formed by any suitable technique, including, but not limited to, cold forming, hot forming, rolling, extrusion, additive manufacturing, hot isostatic pressing, cold isostatic pressing, molding, compression molding, casting, vacuum casting, slip casting, or combinations thereof. The melt infiltration agent construct 124 may be disposed within at least one CMC precursor ply 102, disposed on at least one CMC precursor ply 102, disposed between CMC precursor plies 102, or combinations thereof. The melt infiltration agent construct 124 may include at least one component of the matrix precursor 108, at least one ceramic fiber 110, or combinations thereof.

In one embodiment, wherein the entrained agent supply 106 includes at least one melt infiltration agent construct 124, and the at least one melt infiltration agent construct 124 includes at least one melt infiltration agent ply 126, the melt infiltration agent ply 126 may be interspersed amongst the plurality of CMC precursor plies 102.

In another embodiment, wherein the entrained agent supply 106 includes at least one melt infiltration agent construct 124, and the at least one melt infiltration agent construct 124 includes at least one melt infiltration agent fiber 128, the melt infiltration agent fiber 128 may be disposed within at least one CMC precursor ply 102, disposed between CMC precursor plies 102, or both. The at least one melt infiltration agent fiber 128 may be wound or interwoven with the plurality of ceramic fibers 110 to form a unidirectional tape, a weave, or any other suitable structure, or may be disposed in at least one CMC precursor ply 102 independently from the plurality of ceramic fibers 110.

The at least one melt infiltration agent fiber 128 may include any suitable size. In one embodiment, the at least one melt infiltration agent fiber 128 includes a diameter between about 50% to about 150% of the plurality of ceramic fibers 110, alternatively between about 50% to about 100%, alternatively between about 75% to about 125%, alternatively between about 100% to about 150%, alternatively between about 50% to about 70%, alternatively between about 60% to about 80%, alternatively between about 70% to about 90%, alternatively between about 80% to about 100%, alternatively between about 90% to about 110%, alternatively between about 100% to about 120%, alternatively between about 110% to about 130%, alternatively between about 120% to about 140%, alternatively between about 130% to about 150%. In another embodiment, the melt infiltration agent fiber 128 includes a diameter from about 5 microns up to about an average ply thickness of the plurality of CMC precursor plies 102, alternatively from about 10 microns up to about an average ply thickness of the plurality of CMC precursor plies 102, alternatively from about 15 microns up to about an average ply thickness of the plurality of CMC precursor plies 102, alternatively from about 20 microns up to about an average ply thickness of the plurality of CMC precursor plies 102.

In one embodiment, wherein the entrained agent supply 106 includes at least one melt infiltration agent construct 124, and the at least one melt infiltration agent construct 124 includes at least one melt infiltration agent mandrel 130, the melt infiltration agent mandrel 130 is disposed amongst the plurality of CMC precursor plies 102, and includes structural support for the CMC precursor plies to form the article conformation 112. A plurality of the melt infiltration agent mandrels 130 may be included to reduce or eliminate the formation of a silicon or silicon alloy island in the CMC article 200.

The article conformation 112 may be that of any suitable article, including but not limited to, a turbine component. Suitable turbine components include, but are not limited to, airfoils, buckets (also known as blades), bucket dovetails (also known as blade dovetails), nozzles (also known as vanes), shrouds, combustor liners, combustor transition pieces, disks, ducts, augmentors, exhaust nozzles, casings, or combinations thereof.

In one embodiment, an external melt infiltration agent 132 is infused into the plurality of CMC precursor plies 102 from an external source 134. The external melt infiltration agent 132 may include, but is not limited to, silicon, silicon alloys, or combinations thereof. The external melt infiltration agent 132 may have the same composition as the melt infiltration agent 104 or a distinct composition from the melt infiltration agent 104.

In a further embodiment, wherein the entrained agent supply 106 includes at least one melt infiltration agent fiber 128, infusing the external melt infiltration agent 132 from the external source 134 into the plurality of CMC precursor plies 102 includes infusing the external melt infiltration agent 132 from the external source 134 through a plurality of channels disposed in the CMC precursor ply assembly (not shown), wherein the plurality of channels are formed by infusing the melt infiltration agent 104 from the at least one melt infiltration agent fiber 128 into the plurality of CMC precursor plies 102. The plurality of channels may be substantially filled in with the melt infiltration agent 104 prior to densifying the CMC precursor ply assembly 100.

The plurality of ceramic fibers 110 may include, but is not limited to, fibers stable at temperatures exceeding 1,000° C., aluminum oxide fibers, carbon fibers, silicon carbide fibers, zirconium oxide fibers, mullite fibers, or combinations thereof. The matrix precursor 108 may include, but is not limited to, plasticizers, binders, particulates, or combinations thereof.

The CMC article 200 may include a plurality of CMC plies 202 and may include any suitable CMC composition of ceramic fibers 110 and matrix 204, including, but not limited to carbon-fiber-reinforced silicon carbides (C/SiC), silicon-carbide-fiber-reinforced silicon carbides (SiC/SiC), silicon-nitride-fiber-reinforced silicon nitrides ($Si_3N_4/Si_3N_4$), or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for forming a ceramic matrix composite (CMC) article, comprising:
    forming a CMC precursor ply assembly, forming the CMC precursor ply assembly including:
        laying up a plurality of CMC precursor plies, each of the plurality of CMC precursor plies including a matrix precursor and a plurality of ceramic fibers; and
        entraining a melt infiltration agent to form an entrained agent supply, wherein the entrained agent supply includes a plurality of melt infiltration agent fibers, and
        wherein the plurality of CMC precursor plies and the entrained agent supply are arranged to form the CMC precursor ply assembly, the CMC precursor ply assembly including an article conformation;
    carbonizing the CMC precursor ply assembly;
    infusing the melt infiltration agent from the entrained agent supply into the plurality of CMC precursor plies;
    infusing an external melt infiltration agent from an external source into the plurality of CMC precursor plies, the external melt infiltration agent including at least one of silicon and a silicon alloy; and
    densifying the CMC precursor ply assembly with the melt infiltration agent to form the CMC article,
    wherein infusing the external melt infiltration agent from the external source into the plurality of CMC precursor plies includes infusing the external melt infiltration agent from the external source through a plurality of channels disposed in the CMC precursor ply assembly, the plurality of channels being formed by infusing the melt infiltration agent from the plurality of melt infiltration agent fibers into the plurality of CMC precursor plies.

2. The method of claim 1, wherein the entraining includes disposing the entrained agent supply between the plurality of CMC precursor plies.

3. The method of claim 1, wherein the entraining includes disposing the entrained agent supply within the plurality of CMC precursor plies.

4. The method of claim 1, wherein the entraining includes homogeneously distributing the melt infiltration agent throughout the CMC precursor ply assembly.

5. The method of claim 1, wherein the entraining includes heterogeneously distributing the melt infiltration agent throughout the CMC precursor ply assembly.

6. The method of claim 5, wherein the entraining further includes distributing an increased density of the melt infiltration agent in a first portion of the CMC precursor ply assembly relative to a second portion of the CMC precursor ply assembly, the first portion having an assembled ply thickness greater than the second portion.

7. The method of claim 1, wherein the melt infiltration agent includes at least one of silicon and a silicon alloy.

8. The method of claim 1, wherein the entrained agent supply constitutes, by weight, at least about 25% of the CMC precursor ply assembly.

9. The method of claim 1, wherein the entrained agent supply further includes at least one of a melt infiltration agent powder, a melt infiltration agent coating, a melt infiltration agent construct other than a powder, a melt infiltration agent ply, and a melt infiltration agent mandrel.

10. The method of claim 9, wherein the entraining includes disposing the melt infiltration agent coating on at least one of the plurality of CMC precursor plies.

11. The method of claim 9, wherein the entraining includes disposing the melt infiltration agent coating on at least one of the plurality of ceramic fibers.

12. The method of claim 1, wherein the plurality of melt infiltration agent fibers include a diameter between about 75% to about 125% of the plurality of ceramic fibers.

13. The method of claim 1, wherein the plurality of melt infiltration agent fibers include a diameter from about 10 microns up to about an average ply thickness of the plurality of CMC precursor plies.

14. The method of claim 1, wherein the article conformation is a turbine component selected from the group consisting of airfoils, buckets, bucket dovetails, nozzles, shrouds, combustor liners, combustor transition pieces, disks, ducts, augmentors, exhaust nozzles, casings, and combinations thereof.

15. The method of claim 1, wherein the plurality of ceramic fibers is selected from the group consisting of fibers stable at temperatures exceeding 1,000° C., aluminum oxide fibers, carbon fibers, silicon carbide fibers, zirconium oxide fibers, mullite fibers, and combinations thereof.

16. The method of claim 1, wherein forming the CMC article includes forming a CMC composition selected from the group consisting of carbon-fiber-reinforced silicon carbides (C/SiC), silicon-carbide-fiber-reinforced silicon carbides (SiC/SiC), silicon-nitride-fiber-reinforced silicon nitrides ($Si_3N_4/Si_3N_4$), and combinations thereof.

17. The method of claim 1, further including substantially filling in the plurality of channels with the melt infiltration agent prior to densifying the CMC precursor ply assembly.

18. The method of claim 1, wherein the infusing the melt infiltration agent into the CMC precursor ply assembly and the densifying the CMC ply assembly are more complete than in a comparative method in which the CMC precursor ply assembly lacks the entrained agent supply.

* * * * *